United States Patent [19]

Kumar et al.

[11] Patent Number: 5,197,137
[45] Date of Patent: Mar. 23, 1993

[54] COMPUTER ARCHITECTURE FOR THE CONCURRENT EXECUTION OF SEQUENTIAL PROGRAMS

[75] Inventors: Manoj Kumar, Yorktown Heights; Ambuj Goyal, Amawalk, both of N.Y.

[73] Assignee: International Business Machines Corporation, Armonk, N.Y.

[21] Appl. No.: 387,552

[22] Filed: Jul. 28, 1989

[51] Int. Cl.$^5$ .............................................. G06F 9/30
[52] U.S. Cl. ............................ 395/375; 364/DIG. 1; 364/224; 364/267.9; 364/242.94; 364/232.22
[58] Field of Search ... 364/200 MS File, 900 MS File; 395/375, 775, 200, 800, 700

[56] References Cited

U.S. PATENT DOCUMENTS

| | | |
|---|---|---|
| 3,573,854 | 4/1971 | Watson et al. |
| 4,295,193 | 10/1981 | Pomerene . |
| 4,415,969 | 11/1983 | Bayliss et al. ................... 364/200 |
| 4,476,525 | 10/1984 | Ishii . |
| 4,598,365 | 7/1986 | Boothroyd et al. ............. 364/200 |
| 4,903,196 | 2/1990 | Pomerene et al. ............... 364/200 |
| 4,942,525 | 7/1990 | Shintani et al. ................. 364/200 |

OTHER PUBLICATIONS

Gurd et al.—"Manchester Prototype Dataflow Computer" Jan. 1985.
Hwu et al.—"Architecture Having Minimal Functionality" 1986.
Wu et al—"On a Class of Multistage Interconnection Network" 1980.
Kathail et al—"A Multiple Processor Data Flow Machine That Supports Generalized Procedures" 1981.
Pleszkun et al.—"Structured Memory Architecture" 1982.
Smith—"Decoupled Access/Execute Computer Architecture" Nov. 1984.
Losq—"Asymmetric Double Decode Computer" 1980.
Padua et al.—"High-Speed Multiprocessors and Compilation Techniques" 1980.
Fisher—"Very Long Instruction Word Architectures and The ELI-512" 1983.

Primary Examiner—Kevin A. Kriess
Attorney, Agent, or Firm—Ratner & Prestia

[57] ABSTRACT

A computer system processes mixed control, indexing and data manipulation instructions in groups of N instructions at a time. A group of instructions is applied to a set of N Dispatch units which execute the control and indexing instructions directly. The Dispatch Units convert data manipulation instructions into a more primitive data flow operations. The data flow operations are applied to a set of M Execution Units which process the operations concurrently by observing data dependency constraints. The data used by the control and indexing instructions is stored in a group of identical memory structures which are accessible by each of the Dispatch Units. Data for the data manipulation instructions is stored in a data structure which is divided among the Execution Units.

10 Claims, 6 Drawing Sheets

COMPUTER ARCHITECTURE FOR THE CONCURRENT EXECUTION OF SEQUENTIAL PROGRAMS

BACKGROUND OF THE INVENTION

Field of the Invention

The present invention generally relates to stored program digital computers and, more particularly, to a computer system capable of exploiting concurrent processing techniques when executing a sequential program.

Parallel processing has become increasingly popular in recent years as a means of achieving high performance in digital computers. Attention has been focused primarily on finding large and distinct instruction sequences in a user program which can be executed simultaneously while requiring minimal inter-sequence communication or synchronization. Most multiprocessor and parallel processor designs which have been proposed in the past can be differentiated by the choices that were made for these sequences and the communication and synchronization facilities that were provided. As this parallel processing approach is pushed further, the advantages of adding extra processors to a high performance parallel processor diminish because of the increased communication and synchronization requirements between the concurrently executing instruction sequences.

In general, the execution of an instruction can be partitioned into two separate actions. The first action is to select the instruction and dispatch it to an ALU for execution. The second action is to actually execute the selected instruction. According to established conventions, an instruction should not be selected for execution until all instructions that either provide an intermediate result used by this instruction as an input operand or that reference or update a value which is also updated by this instruction, have completed execution. In early processor designs, these constraints (also known as data dependency constraints) were met by issuing an instruction only when all preceding instructions had completed execution. This approach is restrictive because several types of instructions, such as floating point operations, may be executed over several cycles by a dedicated floating-point processor. Limiting the issuance of a non-floating-point instruction until after the floating-point instruction has completed may leave portions of the processor needlessly idle.

In current processor designs which use pipelined Execution Units, an instruction can be dispatched before the preceding instructions have completed execution. If there is a data dependency between such an instruction and another instruction being processed in the execution pipeline, hardware interlock mechanisms are used to block the actual execution of this dispatched instruction until the data dependencies have been resolved. In this instance, however, instructions that follow this blocked instruction are also blocked even though they may not be dependent on any of the currently executing or blocked instructions. Because of the above mentioned blocking phenomenon, the instruction dispatch rate in pipelined processors is often less than one instruction per machine cycle. Moreover, the complexity of the hardware interlock mechanism interferes with the extension of this design to a design that allows the dispatch of several instructions concurrently.

In Very Long Instruction Word architectures, several instructions (up to a fixed maximum) may be dispatched in each machine cycle. In these machines, compile time analysis is used to combine successive instructions into groups. All instructions in a group may be dispatched simultaneously. For This type of grouping to work properly, a result produced by an instruction in a group may not used by subsequent instructions in the same group. This restriction limits the number of instructions that can be dispatched simultaneously. Another consideration which may limit the number of instructions that can be dispatched simultaneously is conditional branch instructions. These instructions may change the sequence of instructions executed by the processor based on a logical condition. The instructions following a conditional branch should not be executed until the conditional branch has been evaluated.

In addition to the considerations set forth above, one group of instructions to be executed on a Very Long Instruction Word machine should not be dispatched until all the instructions in the previous group have completed execution. This restriction exists because of data dependency constraints and because the pipelining of an entire instruction group may require prohibitively expensive processing hardware.

A third type of processor design is the data flow computer. In a computer of this type, instructions which manipulate data are allowed to execute concurrently. An instruction cannot be executed, however, until all of its input operands are available. Since the output operand of one instruction is an input operand for a subsequent instruction, sequencing of the instructions is automatically controlled. This type of computer is inefficient in handling control flow instructions, such as conditional branch operations, which generate unstructured control flow graphs. For these machines, the most effective way to handle such control flow instructions is to switch to a serial processing mode until the control flow problem has been resolved.

A paper by W. HWU et al., entitled "HPSm, a High Performance Restricted Data Flow Architecture Having Minimal Functionality", Proc. 13th Annual International Symp. on Computer Architecture, 1986, pp 297–306 relates to a system in which both control information and data to be manipulated are stored in a single memory. A single instruction decoder processes control flow instructions, using branch prediction, and generates data flow instructions and for each data manipulation instruction it encounters. These instructions are merged into a data flow graph which includes existing data flow instructions in a centralized node table. The instructions in the node table are awaiting execution by a group of parallel data driven processors. When the input operands of an instruction in the node table are available, the instruction is selected for execution by one of the data flow processors.

U.S. Pat. No. 4,476,525 to Ishii concerns a pipeline-controlled data processing system in which instructions are fetched and decoded prior to execution. As instructions are decoded and evaluated, arithmetic operations and memory storage instructions are combined for simultaneous execution, thus decreasing total execution time.

U.S. Pat. No. 4,295,193 to Pomerene, assigned to the assignee of the present invention, relates to a processor that is designed to simultaneously execute two or more instructions. The instructions to be executed are divided into groups having, at most, N instructions each. This may be done, for example, during compilation. Each group may have only a predetermined number of data accesses (less than the number of accesses used to execute N instructions), and furthermore, each data access is to a different data value. Each instruction in a group uses separate instruction execution hardware.

U.S. Pat No. 3,573,854 to Watson et al. relates to a pipelined architecture in which operands are fetched from memory before an arithmetic expression which uses the operands is evaluated by the ALU. Because the operands are prefetched, time spent by the ALU waiting for operands to be retrieved from memory is greatly reduced. This prefetching feature is useful for evaluating branch conditions before they are encountered to increase program execution speed.

SUMMARY OF THE INVENTION

The present invention is embodied in a computer system which concurrently processes a sequential program that includes mixed instructions of first and second types. The system includes an Instruction Buffer that provides M instructions at a time to a group of M Dispatch Units. The Dispatch Units execute the instructions of the first type directly and convert the instructions of the second type into primitive instructions which are dispatched to N Execution Units. The Execution Units are data-driven processors which execute the primitive instructions concurrently.

According to another aspect of the invention, the data space accessed by the processing system is partitioned into a first segment which is accessed primarily by the Dispatch Units and a second segment which is accessed primarily by the Execution Units.

According to yet another aspect of the invention, a conditional assignment instruction is provided in which instructions from a conditional section are evaluated before the condition guarding the section is evaluated. If the evaluation of the condition indicates that the instructions should not have been evaluated, the result is discarded. Otherwise, the result is assigned to the object of the conditional assignment operation.

DETAILED DESCRIPTION OF THE PREFERRED EMBODIMENT OF THE INVENTION

General Overview

The embodiment of the invention described below is a processor architecture which can dispatch and execute several instructions from a conventional program in each machine cycle. This processor is designed to execute scientific application programs efficiently. The architecture exploits a tendency for scientific programs to use two different types of data. The first type consists of a relatively small number of scalar variables that are used either to determine the flow of control in the program, or as indices into large arrays. The second type of data consists predominantly of large arrays containing the actual data to be manipulated by the program. This data is usually in floating-point format and is manipulated by operations which span several machine cycles.

The proposed architecture uses multiple Dispatch Units and multiple Execution Units. Data which is used to determine the control flow of the program and the indexing of array elements are differentiated from the actual data being manipulated. These two types of data are assigned to separate address spaces and stored in separate memory modules, however data can be moved between these address spaces. Operations on the first type of data are performed predominantly in the Dispatch Units in a conventional control flow manner. Operations on the second type of data are carried out predominantly in the Execution Units in a data-driven manner. Thus, a new set of multi-cycle floating point operations can be dispatched to the Execution Units before the operations in the previously dispatched set have completed execution. A conditional assign instruction is introduced into the instruction set. It is used to execute instructions from short conditional sections before the condition guarding the section is evaluated. By using this instruction, delays caused by conditional branch instructions may be avoided.

Referring to FIGURE I, an exemplary architecture for exploiting concurrence in a sequential program includes five basic components: an Instruction Memory 201; a group of M Dispatch Units, including units 204 and 206; a Crossbar Network 207, a group of N Execution Units, including units 208 and 210, and a Data Communications Network 212.

The Data Communications Network 212 may be one of a group of networks described in a paper by C-L. WU et al. entitled "On a Class of Multistage Interconnection Networks", IEEE Transactions on Computers, Vol. C-29, No. 8, Aug. 1980, pp 694–702, which is hereby incorporated by reference. Alternatively, the Network 212 may be a conventional crossbar switch network such as the Crossbar Network 207 described below.

The Instruction Memory 201 contains a sequence of instructions which are provided to the Dispatch Units. These instructions can be partitioned into two types. Instructions of the first type are integer operations which control program flow and determine array indices. Instructions of the second type are operations which manipulate large data structures.

Figure 2:
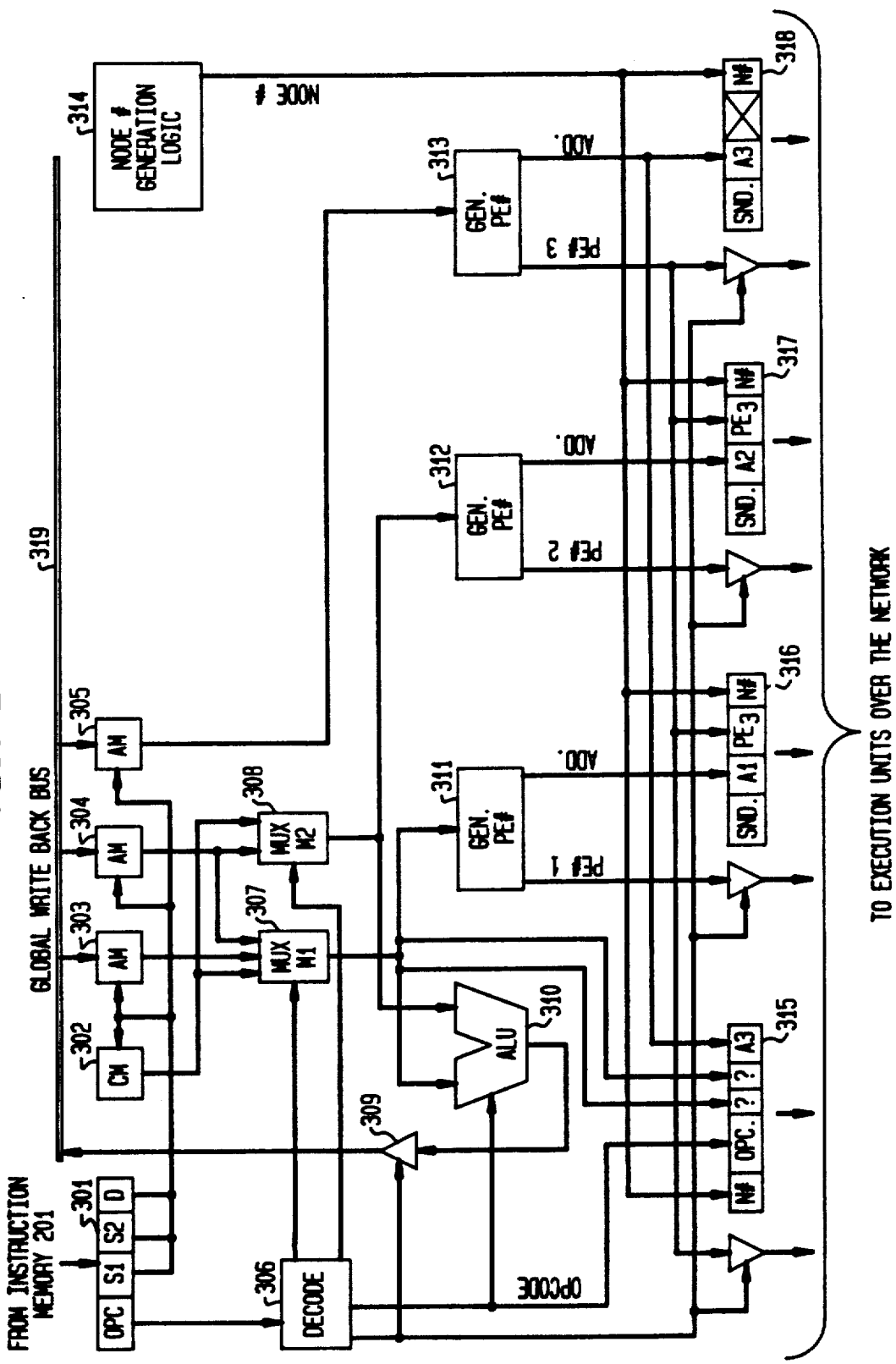
FIG. 2 is a block diagram of a Dispatch Unit suitable for use in the computer system shown in FIG. 1.

The Dispatch Units 204 through 206 directly execute instructions of the first type and translate the instructions of the second type into primitive operation sequences. Referring to FIG. 2, each Dispatch Unit includes a Constant Memory 302, three Address Memories 303, 304 and 305, and an arithmetic and logic unit (ALU) 310. The instructions of the first type are executed by the ALU 310.

The Crossbar Network 207 transfers the primitive command sequences, provided by the Dispatch Units 204 through 206, to selected ones of the Execution Units 208 through 210.

Figure 3:
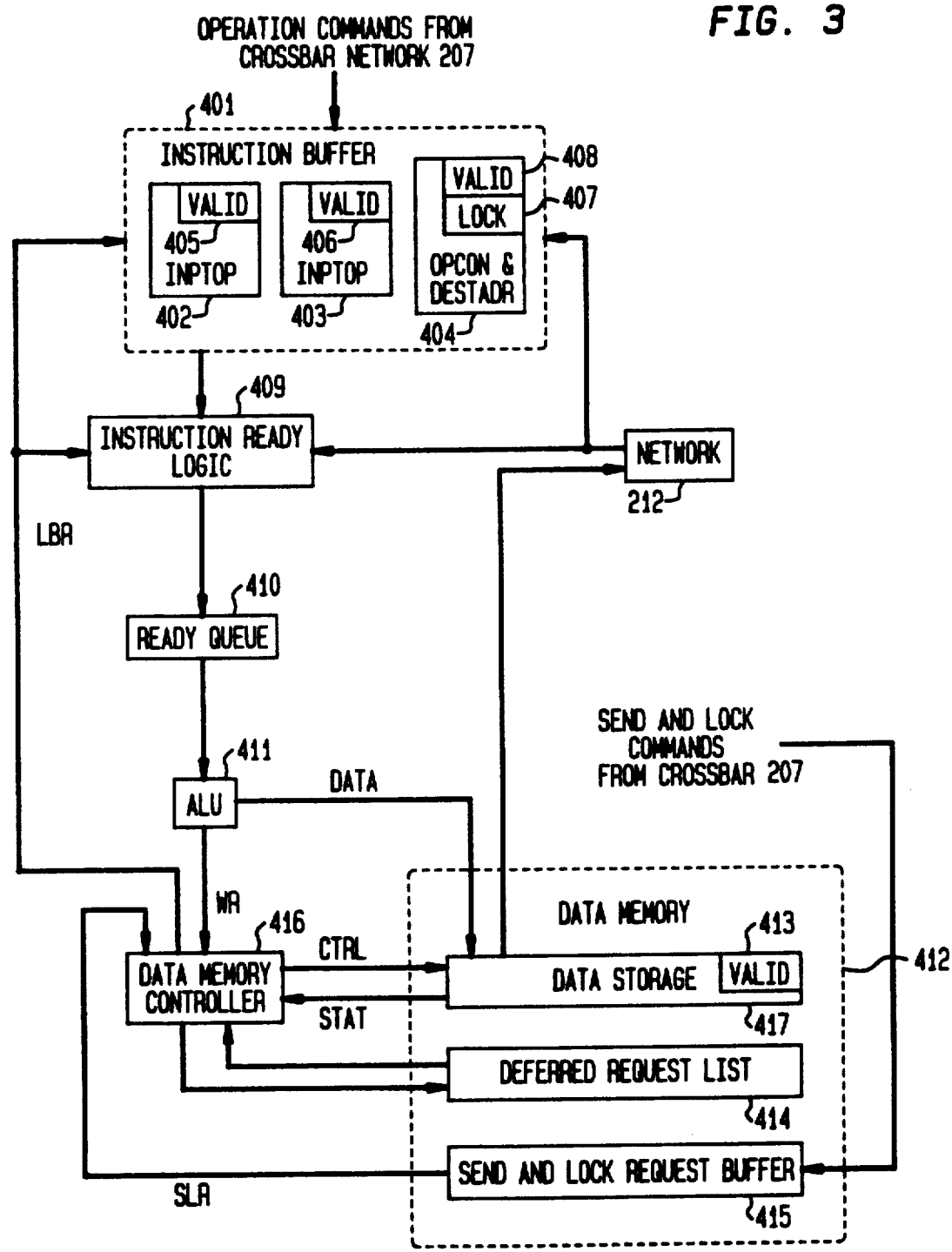
FIG. 3 is a block diagram of an Execution Unit suitable for use in the computer system shown in FIG. 2.

The Execution Units 208 through 210 execute these primitive operations. Each of the Execution Units 208–210 contains a respective Data Memory 211–213 in which arithmetic operands are stored and retrieved. Referring to FIG. 3, a floating-point ALU 411 performs arithmetic and logical operations as indicated by the primitive operation sequence. The ALU 411 generates operand values which are sent to the Data Memory 412 and control signals which are sent to a Data Memory Controller 416. The Data Memory Controller, in turn, controls the transfer of data to the memory 412 and among the memories of the Execution Units 208-210. The Data Communications Network 212 is used to perform data transfer operations between Execution Units.

DETAILED DESCRIPTION

Figure 1:
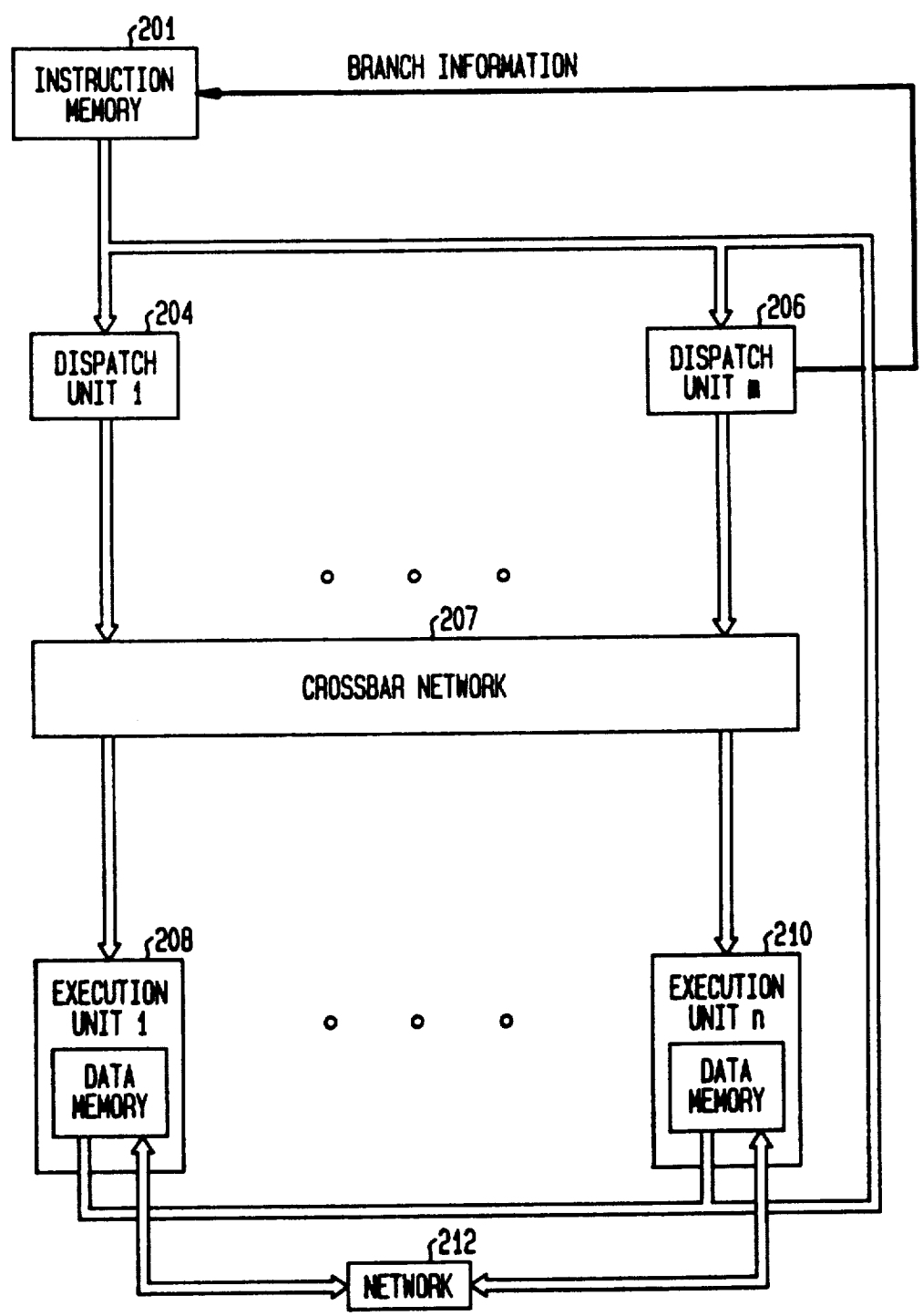
FIG. 1 is a block diagram of an exemplary computer system which incorporates an embodiment of the present invention.

In the exemplary system shown in FIG. 1, a program, designating a sequence of instructions to be executed by the computer system, is stored within the Instruction Memory 201. Each word in the Instruction Memory 201, referred to as an instruction group, consists of several instructions. Each instruction includes either three or four fields: an operation to be performed (opcode), one or two source operands (depending on the type of operation) and a destination operand. For instructions of the second type, these fields are converted into primitive instructions or commands.

An instruction group is provided by the Instruction Memory 201 to the Dispatch Units 204-206. The Instruction Memory 201 is organized so that one instruction group, comprising M instructions, where M is the number of Dispatch Units in the processor, can be read out and delivered to the Dispatch Units in each machine cycle—one instruction per Dispatch Unit.

FIG. 2 is a block diagram of an exemplary Dispatch Unit. As shown in FIG. 2, each Dispatch Unit 204-206 includes three Address Memories 303, 304, 305 and a Constant Memory 302. The Address Memories and Constant Memories in each Dispatch Unit represent multiple copies of respective single data structures.

The Constant Memories in each of the Dispatch Units contain identical values. These memories are used to hold data that does not change during the execution of a program, such as constants and base addresses of structured data in the Data Memories 211-213. This type of data is accessed frequently but accounts for a small fraction of the data storage used by the program. Consequently, the Constant Memories are implemented as small, highspeed memory modules which are replicated in each Dispatch Unit.

The Address Memories 303, 304 and 305 hold data items such as addresses of operands in the Data Memories 211-213, offsets into arrays and loop constants. This type of data is frequently accessed but only occasionally modified. This type of data also forms a relatively small part of the data storage used by the program. This memory is replicated in each Dispatch Unit. Within a Dispatch Unit the Address Memory is replicated three times to provide multiple simultaneous access capability. Thus, during one machine cycle the various Address Memories may be conditioned to perform three read operations for each Dispatch Unit in the system and one write operation from one Dispatch Unit. Data can be read from each copy of the Address Memory 303, 304, 305 independently but data is written into all copies simultaneously from a common write bus 319 that spans all the Dispatch Units 204-206. This accessing technique maintains identical contents in all of the Address Memories 303, 304 and 305 in all of the Dispatch Units 204-206. It is contemplated that the restriction of providing only one write operation in each machine cycle may be rescinded by providing multiple write buses that span all processors and multiported Address Memory modules so that values conveyed by each of the buses can be written to all memory modules simultaneously. Moreover, it is contemplated that the three read operations of a Dispatch Unit may be supported by less than three Address Memory modules if faster memory circuits or multiported memory modules are used.

The operation of the exemplary Dispatch Unit 204 begins when an instruction is transferred from the Instruction Memory 201 to an instruction register 301. The values in the instruction fields SI and S2, the addresses of the source operands, are applied to the address input ports of the respective Address Memory modules 303 and 304. These values may directly address input operands for instructions to be executed in the Dispatch Unit 204, or they may directly or indirectly address operands for instructions to be executed by the Execution Units 208-210. When these values are indirect addresses, the values provided by the Address Memories 303, 304 and 305 are addresses of storage cells in the Data Memories 211-213. The address, S1, of the first source operand is also sent to the Constant Memory 202 to read out a constant value.

Depending on the opcode field of the register 301, multiplexer 307 and multiplexer 308 select from among the values provided by the memories 320, 303, 304 and 305 to provide operands for the current instruction. These operands may be used by the ALU 310 in the Dispatch Unit 204, or they may be input values which are used as operands or addresses of input operands for instructions dispatched to the Execution Unit 208.

The value in field D of the instruction held in the register 301 is applied to the address input port of the Address Memory 305. In response to this value, the memory 305 provides the address for storing the result of the instruction held in register 301.

The value provided by multiplexer 308 may be either the contents of Address Memory 304 at the location indicated by the field S2, or the contents of the Constant Memory 302 at the location indicated by the field S1. The value provided by the multiplexer 307 may be either the contents of the Constant Memory 302 at the address indicated by the field S1 or the contents of the Address Memories 303 and 304 at the location indicated by either of the fields SI and S2.

When the operation indicated by the instruction opcode may be carried out in the Dispatch Unit 204 (i.e. an integer operation on the data held in the Address or Constant Memories 303 and 302), it is performed by the ALU 310. An example of an operation which may be performed by the ALU 310 is the addition of an array offset value, obtained from the Address Memory 303, to a base value obtained from the Constant Memories 302. The output value provided by the ALU 310 is sent through a driver 309 to the write back bus 319 and written into all of the Address Memory modules 303, 304 and 305 in each Dispatch Unit 204-206. The program executed by the processor is desirably written or compiled to insure that in any given machine cycle, only one Dispatch Unit sends data to the various Address Memories via the write back bus 319.

If the operation indicated by the opcode is not carried out in the Dispatch Unit (e.g. a complex floating-point operation), it is converted by the Dispatch Unit into a set of primitive commands which are sent to one or more of the Execution Units 208-210.

The Dispatch Unit directs source operand information for each command through the multiplexers 307 and 308. Destination address information for each command is provided by the Address Memory 305, directly. For instructions forwarded to the Execution Units, these operands and operand addresses are fed to Generate PE Number Logic Elements 311, 312 and 313, respectively. These Logic Elements pass constant data values without modification and translate the memory addresses values into an identification number for the appropriate Data Memory module (i.e. the number of an Execution Unit in Which the Data Memory module resides and an address in that module). In this embodiment of the invention, data addresses are interleaved in fixed size blocks among the Data Memory modules in the various Execution Units. Therefore, the Generate PE Number Logic elements 311, 312 and 313 may select a predefined set of bits from the incoming address value to determine the Execution Unit in which the addressed data resides. The remaining bits of the address value are treated as the address within the Data Memory module of the selected Execution Unit. In an alternative embodiment, programmable logic (not shown) may be used to provide more flexible partitioning of data within the Data Memory module of each Execution Unit to remove the "fixed size block" restriction inherent in th method described above.

Node Number Generation Logic 314 is used to assign a common identifying node number to each primitive instruction derived from a program instruction. While all Node numbers at any given time are unique, Node numbers for program instructions that have been executed may be recycled as necessary. Node numbers may be generated, for example, by an 8 bit counter (not shown) in each of the Dispatch Units 204–206. The counter is set to an initial value within a contiguous address space which has been assigned to a particular Dispatch Unit, and incre nented in every machine cycle. This scheme works because, at any given time, the number of instructions that have been dispatched but have not yet been executed is less than a prespecified design limit.

The program instructions dispatched by the Dispatch Units 204–206 are partitioned into one of three categories: arithmetic and logical instructions, conditional branch instructions, and conditional assign instructions. Unconditional branch instructions are handled by the Instruction Buffer.

Each arithmetic or logical instruction is translated by a Dispatch Unit into three types of primitive operations or commands: an operation command, a LOCK command and one or two SEND commands. An operation command consists of the operation to be performed, a node number for the parent instruction, and a location in the local Data Memory 412 where the result of this operation is to be stored. Node numbers uniquely identify operations that have been dispatched but have not yet been executed. A LOCK command prevents subsequent instructions from reading or updating the Data Memory location which will be updated by the parent instruction, until this update actually takes place.

A SEND command is sent to the Execution Units 208–210 having Data Memory modules which contain the input operands of the subject instruction. This command conditions the Execution Units 208–210 to provide the requested input operand values, from their local Data Memories, to the Execution Unit in which the parent command will be executed. The SEND command contains three fields: an address, in the Data Memory module from which the operand is to be fetched; a value identifying the Execution Unit 208–210 to which the operand is to be sent; and a node number which is common to all primitive operations generated from the same program instruction. One or two primitive SEND commands may be generated for each program instruction, depending on whether the program instruction uses one or two source operands.

Source operands for a primitive operation may be obtained from the Data Memory module of any of the Execution Units 208–210. In this embodiment of the invention, the operation specified by a primitive command is always carried out in the Execution Unit having the Data Memory module in which the result of the operation will be stored. However, it is contemplated that any Execution Unit may perform this operation. In this instance, the operation command may include an extra field (not shown) which is used to store the result into the appropriate Data Memory module.

Conditional branch instructions receive special treatment in this embodiment of the invention. Programs which include conditional branch instructions are physically aligned within the Instruction Memory 201 so that the conditional branch instructions are always sent to a specific Dispatch Unit, 206 (i.e. the last one). Although the instructions are executed concurrently, the organization of the computer system ensures that instructions applied to the various Dispatch Units in any machine cycle will not be executed out of sequence. The conditional branch instructions are assigned to the last Dispatch Unit 206 to ensure that instructions following the conditional branch instruction are not executed until after the branch has been resolved. In this embodiment of the invention, the sequencing of the instructions to ensure that branch instructions are always assigned to the Dispatch Unit 206 is accomplished by dividing the program instructions, based on the occurrence of conditional branch instructions, into groups having at most M members, where M is the number of Dispatch Units. Instruction groups having fewer than M members are extended to have M members by inserting null or 'NO-OP' instructions before the conditional branch instruction. These steps ensure the desired positioning of a branch instruction within an instruction sequence.

The conditional assign instruction is used to execute a set of instructions before a condition guarding the set is evaluated. This instruction type avoids unnecessary fetch delays. The conditional assign instruction is a three operand instruction, two source operands and one destination address. The first source operand is a boolean value. The second source operand and the destination operand are preferably of the same type. The value of the second source operand is assigned to the location indicated by the destination address if the first operand is true. Otherwise, no action is taken.

Primitive commands are dispatched to the Execution Units 208–210 via the Crossbar Network 207. The Network 207 may include a conventional crossbar switch capable of coupling any one of the three output ports of any of the Dispatch Units 204–206 to any one of the Execution Units 208–210. To preserve proper instruction sequencing, the primitive commands provided by the various Dispatch Units are applied to the Network 207 coincident with respectively different phases of a clock signal which defines the machine cycle. The Crossbar Network 207 couples the output ports of each Dispatch Units to its requested Execution Units coincident with the respective phases of the clock signal. The Network 207 queues requests for a single Execution Unit and is able to handle two such requests in the time interval between successive clock phases. The requests are queued in the order in which they appear in the instruction groups. This feature of the Network 207 ensures that all primitive commands generated from a program instruction are dispatched to their respective Execution Units and that they are received before the primitive commands generated from the next subsequent program instruction are dispatched. It is contemplated that other interconnection schemes, such as a multistage network, may be substituted for the crossbar network 207.

FIG. 3 is a block diagram of circuitry suitable for use as one of the Execution Units 208-210. In FIG. 3, primitive commands arriving at a selected Execution Unit are stored in an Instruction Buffer 401. The Buffer 401 which may be, for example, a high speed random-access memory or an associative memory array which is addressed by node numbers. The primitive operations wait in this buffer until source operands from the Data Memories 412 of other Execution Units 208-210 have been obtained and a lock has been obtained on the destination address. Each word in this buffer 401 is partitioned into three fields, two of which, 402 and 403, hold the actual input operand values and one of which, 404, holds the opcode and the destination address. The three fields contain respective valid bits 405, 406 and 407. The operation command and destination address field 404 also contains a lock bit 408. When the lock bit 408 is not set, the instruction is not yet ready for execution. This bit is used to insure that an operation does not modify a memory location which contains data that is still required by a prior instruction.

The SEND and LOCK primitive commands provided via the Crossbar Network 207 are applied to a SEND and LOCK command buffer 415 internal to the Data Memory 412. The processing of these command is set forth in detail below.

Each time an update is made to an addressed location within the Instruction Buffer 401, for example, when a requested operand is received from another Execution Unit, Instruction Ready Circuitry 409 is notified of this update. Upon being notified, the Instruction Ready Circuitry 409 reads the valid bits 405, 406, 407 and the lock bit 408 at the address of the updated instruction to determine whether the instruction is ready for execution. When the instruction is determined to be ready (i.e. when the valid bits 405, 406 and 407 and the lock bit 408 are all set), the Instruction Ready Logic places the instruction in a ready queue 410 from which it is eventually executed by the arithmetic logic unit 411.

A Data Memory Controller 416 is responsible for communication between the ALU 411 and the Data Memory 412 and for processing the SEND and LOCK primitive operations.

The Data Memory module, 412, in the Execution Unit comprises an array of storage cells which are partitioned to hold three types of information. First, there is a section 413 which holds data values that are the source and operands of, or the results produced by arithmetic and logical operations. Next, there is a section 414 which holds a deferred request list. Finally, the section 415 holds SEND and LOCK commands that arrive from the network 418 and are waiting to be examined by the Data Memory Controller 416.

The deferred request list holds SEND and LOCK commands that cannot be processed immediately because of the data dependency constraints. These constraints exist when an addressed memory storage cell specified by a SEND or LOCK command is itself locked in response to a previous LOCK command.

The Data Memory Controller 416 accepts two types of requests, write requests (WR) coming from the ALU 411 and SEND and LOCK commands (SLR) coming from the SEND and LOCK command buffer 415 and from the deferred request list 414. Priority is given to the requests coming from the ALU 411.

A data valid bit 417 is associated with each location in the section, 413, of memory which is used to hold data values. This bit is '1' if the memory location has valid data. When a location contains valid data, SEND commands for the location can be satisfied immediately.

Figure 4:
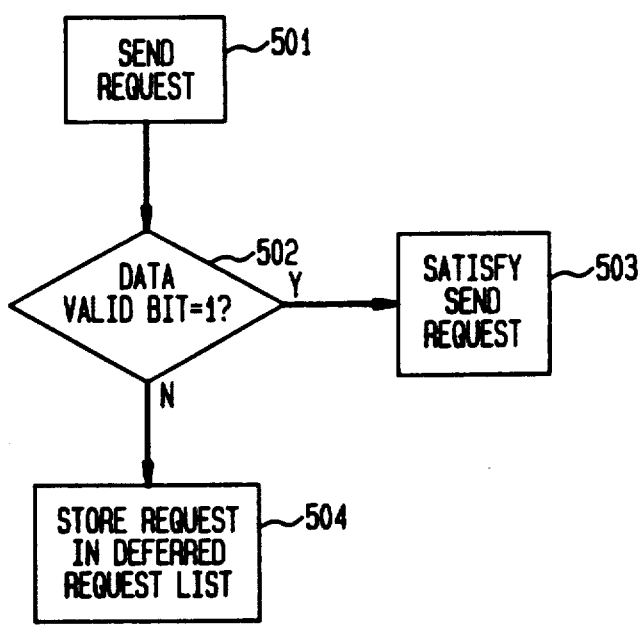
FIGS. 4, 5 and 6 are flow-chart diagrams that are useful for explaining the operation of the Execution Unit shown in FIG. 3.

FIG. 4 is a flowchart diagram which illustrates the execution of a primitive SEND command. A SEND command is received at step 501. Next, a step 502 is executed in which the data valid bit, of the addressed location from which the data is to be sent, is tested. If the data valid bit is '1', then the SEND command is satisfied, as shown at step 503, by applying the data value to the Network 212 with an indication of the Execution Unit which is to receive the data value and the Node Number of the operation command for which the data is intended. Otherwise, the SEND command is stored in the deferred request list 414 as shown at step 504. Commands placed in the Deferred Request List 414 are stored in a linked list data structure. When the data valid bit of a memory location is '0', the contents of this location are treated as a pointer to the Deferred Request List 414. A NULL pointer is used as a pointer for a list with no entries or as a next-link pointer for the last entry in a list. The NULL pointer may be represented by a previously chosen negative number. When the data valid bit of a memory storage cell is turned off by a LOCK command, the value held by the storage cell is changed to the NULL deferred request list pointer.

Figure 5:
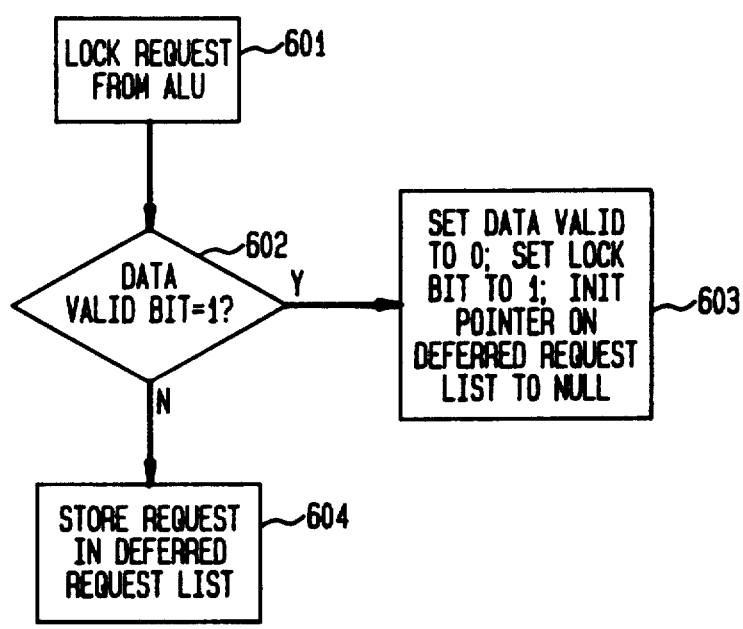

FIG. 5 is a flow chart diagram which illustrates the execution of a primitive LOCK command. A LOCK command is received by the Data Memory Controller 416 at step 601. Next, the data valid bit 417 is evaluated at step 602. As shown at step 603, if the data valid bit is '1', then the data valid bit 417 in the data storage area 413 is set to '0' and a Lock Bit Request (LBR) instruction is sent to the Instruction Buffer 401. This instruction sets the lock bit of the primitive operation having the same Node Number as the LOCK command to '1'. As shown at step 604, a LOCK command for a location with invalid data is handled as a deferred request in the same way that a SEND command for invalid data is handled (described above).

Figure 6:
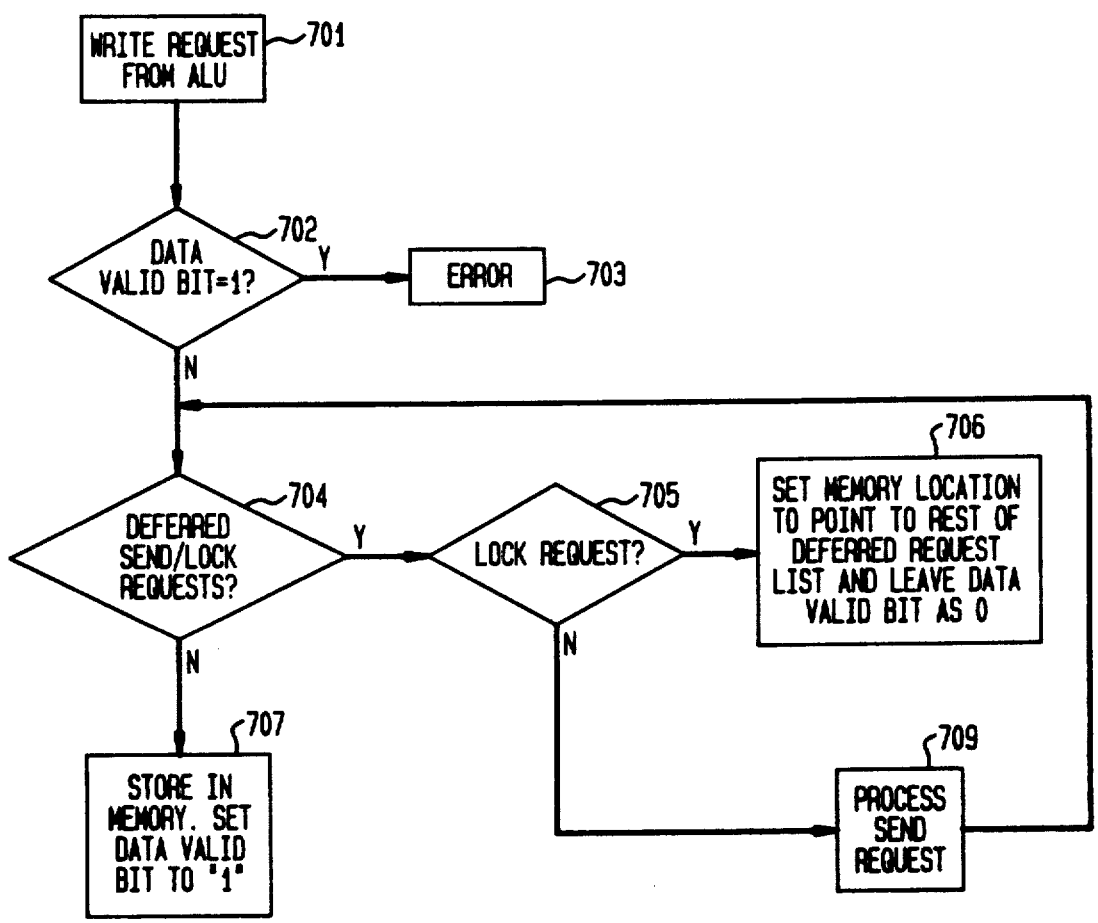

FIG. 6 is a flow chart diagram which illustrates the execution of a write request from the ALU 411. A write request and a data value to be written are received by the Data Memory Controller 416 at step 701, the data valid bit for the requested location in the Data Storage area 413 is evaluated at step 702. If the data valid bit is a '1', an error occurs as shown at step 703. If the data valid bit is zero then, the memory controller, at step 704, determines whether deferred SEND commands or LOCK commands exist for this memory location. If no such commands exist, then, as shown in step 708, the data value is written into the memory location and execution is complete. However, if deferred SEND or LOCK commands exist, then they are processed using the data value held by the Data Memory Controller.

The SEND commands are processed from the list at step 709 until a LOCK command is encountered at step 705 or until the deferred request list is exhausted at step 704.

If a LOCK command is encountered at step 705, the addressed memory location is set to point to the rest of the deferred request list (it is set to NULL if no other deferred requests exist) and the data valid bit is set to '0' as shown at step 706. In this instance, the input data value is not stored into the addressed storage cell. If the deferred request does not contain any LOCK commands, the SEND commands are processed using the data value held by the Data Memory Controller 416. Then, the data value is stored into the addressed memory storage cell and the valid bit 417 for the memory storage cell is set to '1'. The processing of the request list using the data value held by the Data Memory Controller 416 avoids unnecessary read and write operations for the Data Storage portion 413 of the Data Memory 412.

An example of a program well suited for this type of processor, is one which uses the Gauss-Seidel iterative procedure for solving simultaneous linear equations of the form $Ax=b$. The A matrix is usually sparse and therefore, each row is represented in a standard row-pointer and column-index form. The following statements in the program carry out one iteration of the Gauss-Seidel algorithm:

```
10    do 30 i=1, 100
         temp(i) = b(i)

do 20 j = rowptr(i), rowptr(i+1)-1
            temp(i) = temp(i) - entval(j) *
                x(colind(j))
20       continue x(i) = temp(i) / diag(i)
30    continue
```

It is well known that this code is hard to vectorize because of the indirect addressing involved in the innermost loop. However, the processor described above can dispatch all instructions belonging to one iteration of the innermost loop in two machine cycles as shown below. It is assumed that arrays x, temp, diag and entval are in the Data Memories 211-213, and the rest of the arrays and scalars are in the Address Memory 303, 304, 305 and the Constant Memory 302. Temporary variables II, JLIM and CJ are allocated in the Address Memory and FTEMP is allocated in a Data Memory module. The execution of the code could be speeded by making FTEMP an array.

| Cycle | Instruction |
|---|---|
| 1 | i <- 1; |
| 2 | II <- i+1; j <-rowptr(i); branch (i>100) -> 7; |
| 3 | temp(i) <-, b(i); JLIM <- rowptr (ii); |
| 4 | CJ <- colind(j); branch (j>JLIM) 10 -> 6; |
| 5 | mul FTEMP <-, entval(j), x(CJ); sub temp(i) <-, temp(i), FTMP; j <- j+1; branch -> 4; |
| 6 | div x(i) <-, temp(i), diag(i); i 15 <=i+1; branch -> 2; |
| 7 | end. |

The comma and semicolon delimiters mark the boundaries between program instructions. Instructions on both sides of a comma share a node number and a destination address. Thus, a cycle ends with a semicolon. Cycles 2 to 6 contain the outer loop of the program set forth above while cycles 4 and 5 contain the inner loop. No more than one write operation is performed on the Address Memory modules in any cycle. Also, all conditional branches in the code can be resolved by the Dispatch Units 204-206 using information available in the Constant Memory 302 and the Address Memories 303, 304, 305. Consequently, both the inner loop and the outer loop may be dispatched without waiting for the execution to catch up. Thus, it is possible that many iterations of the outer loop could complete out of sequence with all the data dependencies being observed automatically. In other architectures, the outer loop may be forced to complete sequentially because of the indirect addressing on x.

For the exemplary set of equations used in the program set forth above, the matrix A has dimensions of 100 by 100 and the inner loop executes an average of 10 times for each iteration in the outer loop. For this example, each iteration of the Gauss-Seidel procedure dispatches 11100 program instructions in 3100 machine cycles. If the processor executing the program were limited to having only six Dispatch Units, the same number of instructions would be dispatched in 4100 machine cycles. A computer architecture has been described which achieves a high level of concurrence in the processing of a serial program. Although the invention has been described in terms of an exemplary embodiment, one skilled in the art will recognize that it may be practiced as outlined above with modifications within the spirit and scope of the appended claims.

The invention claimed is:

1. A computer system for concurrently processing a sequence of program instructions of mixed first and second types, comprising:
   instruction memory means for holding said sequence of program instructions and for providing successive instructions from said sequence in groups of M instructions where M is an integer greater than one;
   M instruction dispatch means, coupled to receive respectively different ones of the M instructions provided by said instruction memory means, for executing each respective one of the instructions of said first type directly and for generating a respective plurality of primitive operations representing each respective one of the instructions of said second type;
   N instruction operation execution means, where N is an integer greater than one, for concurrently executing ones of the primitive operations provided by said M dispatch means; and
   network means, coupled to each of said M instruction dispatch means and to each of said N instruction operation execution means, for distributing the primitive operations provided by any of said M instruction dispatch means among selected ones of said N instruction operation execution means;
   wherein each of said M instruction dispatch means directs each of said plurality of primitive operations generated from one of said instructions of said second type to a respective one of said N instruction operation executions means via said network means, responsive to said one instruction of said second type.

2. The computer system set forth in claim 1 wherein the instructions of said first type operate on data of a first type, the instructions of said second type operate on data of a second type and the computer system further comprises:
first memory means for holding data of said first type; and
second memory means for holding data of said second type.

3. The computer system set forth in claim 2 wherein said first type of data is primarily integer data and said second type of data is primarily floating-point data.

4. The computer system set forth in claim 2 wherein:
said first memory means includes M identical copies of the data of said first type distributed among the M instruction dispatch means, receptively; and
said second memory means is partitioned among said N operation execution means.

5. The computer system set forth in claim 4 wherein said primitive operations include:
a first type of primitive operation which causes a first one of the N operation execution means to provide a data value from the partition of said second memory associated with said first operation execution means to a second one of said N operation execution means;
a second type of primitive operation which causes said second operation execution means to restrict access to a predetermined storage cell in the partition of aid second memory means associated with said second operation execution means; and
a third type of primitive operation which causes said second operation execution means to perform an arithmetic operation on the data value provided by said first operation execution means and to store the result of said arithmetic operation in said predetermined storage cell.

6. A computer system for concurrently processing a sequence of program instructions having control flow instructions intermixed with data manipulation instructions, comprising:
instruction memory means for holding said sequence of program instructions and for providing successive instructions from said sequence in groups of M instructions where M is an integer greater than one;
M control flow processing means, coupled to receive respectively different ones of the M instructions provided by said instruction memory means, for executing each respective one of said control flow instructions directly and for processing each respective one of said data manipulation instructions to generate a plurality of primitive operations therefrom;
N data flow processing means, where N is an integer greater than 1, for concurrently executing ones of the primitive operations provided by said M control flow processing means; and
network means, coupled to said M control flow processing means and to said N data flow processing means, for distributing the primitive operations provided by said M control flow processing means among said N data flow processing means;
wherein each of said M control flow processing means directs each of said plurality of primitive operations generated from one of said data manipulation instructions to a respective one of said N data flow processing means via said network means, responsive to said one data manipulation instruction.

7. The computer system set forth in claim 6 further comprising:
first memory means for holding data to be manipulated by said control flow instructions; and
second memory means for holding data to be manipulated by said data manipulation instructions.

8. The computer system set forth in claim 7 wherein:
said first memory means includes M identical memory means distributed among said M control flow processing means, respectively, for holding M identical copies of the data to be manipulated by said control flow instructions; and
said second memory means includes N separate memory means, distributed among said N data flow processing means, each of said N separate memory means holding a respectively different portion of the data to be manipulated by said data manipulation instructions.

9. In a computer system including an instruction memory for holding a program which includes a sequence of intermixed control flow instructions, which manipulate a first set of data and determine the control flow of the program, and data manipulation instructions, which manipulate a second set of data and produce output data values for the program, a method of processing the sequence of instructions, comprising the steps of:
storing the first set of data in a first memory element;
storing the second set of data in a second memory element;
processing said sequence of intermixed control flow and data manipulation instructions in a first processing element, including the steps of:
accessing said instruction memory to retrieve said control flow and data manipulation instructions;
Identifying said control flow instructions and said data manipulation instructions;
executing said control flow instructions including the step of accessing said first memory element, independent of any access of said instruction memory; transforming each of said data manipulation instructions into a plurality of data flow operations; and
directing each of said plurality of data flow operations to a respective data flow processing element responsive to the data manipulation instruction from which said plurality of data flow operations was generated; and
executing said data flow operations in a second processing element including the step of accessing said second memory element, independent of any access of said instruction memory or said first memory element, to produce said output data values.

10. A method for operating a computer system having at least first and second processors to execute a condition assignment instruction which conditionally assigns a data value to a memory location, said method comprising the steps of:
dividing the condition assignment instruction into a first set of primitive instructions, including a primitive store instruction, and a second set of primitive instructions;
decoding and executing instructions from the first set of primitive instructions on said first processor to produce said data value;

decoding and executing the second set of primitive instructions on said second processor independently of said first set of instructions to produce a logical result without interrupting the decoding and execution of said first set of instructions;

communicating the logical result to said first processor; and executing said primitive store instruction on said first processor to store said data value in said memory location only if said logical result has a predetermined value.

* * * * *